United States Patent [19]

O'Sullivan

[11] 3,966,494
[45] June 29, 1976

[54] IMPREGNATION OF ELECTRODES FOR NICKEL CADMIUM BATTERIES

[75] Inventor: Thomas Denis O'Sullivan, Madison, N.J.

[73] Assignee: Bell Telephone Laboratories, Incorporated, Murray Hill, N.J.

[22] Filed: Oct. 21, 1974

[21] Appl. No.: 516,791

[52] U.S. Cl. .................................. 136/24; 136/76
[51] Int. Cl.² ......................................... H01M 4/38
[58] Field of Search ............ 136/76, 24, 28; 204/35, 204/56, 50

[56] References Cited
UNITED STATES PATENTS

| | | | |
|---|---|---|---|
| 3,400,056 | 9/1968 | Hills | 136/24 X |
| 3,443,996 | 5/1969 | Falk et al. | 136/76 X |
| 3,449,167 | 6/1969 | Keel et al. | 136/76 |
| 3,560,262 | 2/1971 | Baba et al. | 136/76 |
| 3,573,101 | 3/1971 | Beauchamp | 136/76 |
| 3,837,919 | 9/1974 | Gutridge | 136/76 X |
| 3,873,368 | 3/1975 | Pickett | 136/76 |

OTHER PUBLICATIONS

Zk. Prikl., Khim., (Leningrad) 1970, 43 (3) pp. 683–685, Gamoskin & Pozin (Russ.).

Primary Examiner—John H. Mack
Assistant Examiner—C. F. Lefevour
Attorney, Agent, or Firm—W. G. Nilsen

[57] ABSTRACT

A process is described for making nickel cadmium batteries in which the cadmium electrodes for these batteries are electrolytically impregnated under special conditions and employ a particular electrolytic solution. The electrolytic solution contains not only a soluble form of the cation of the active ingredient for the electrode and nitrate ions, but also certain other ions such as chloride, iodide and sulfate ions which increase the rates of impregnation and also increase the electrode loadings. In addition to obtaining more rapid and greater electrode impregnation, the present process improvements facilitate use of a continuous impregnation procedure.

16 Claims, 3 Drawing Figures

IMPREGNATION OF ELECTRODES FOR NICKEL CADMIUM BATTERIES

BACKGROUND OF THE INVENTION

1. Field of the Invention

The invention relates to methods of fabricating nickel cadmium batteries, and more particularly, to electrolytic procedures for impregnating cadmium electrodes for nickel cadmium batteries.

2. Description of the Prior Art

A commercially established procedure for fabricating electrodes for nickel cadmium batteries is to impregnate a porous supporting electrode structure (i.e., a porous nickel plaque) with finely divided active material so as to present a high surface area of active material to the electrolyte. While loadings obtained in this fashion are quite satisfactory, higher loadings are desirable and reduced time for loading is economically advantageous. In addition, it is desirable to formulate procedures which result in more rapid and more efficient commercial production of these electrodes.

A number of impregnation procedures have been used in the past. Particularly simple was the procedure of soaking the porous plaque in a salt solution and evaporating the liquid. This was followed by soaking the plaque in a second solution to convert the soluble salt to an insoluble active form. Soaking in either the first or second solution, or both, might be repeated several times to increase loading. Thermal decomposition is also used to convert to the insoluble active form. These procedures are generally referred to as chemical impregnation processes.

An alternative approach over the soaking processes is electrolytic impregnation (see L. Kandler, U.S. Pat. No. 3,214,355 issued Oct. 26, 1965). In this process active material is continuously deposited directly in the pores of the plaque. Here the impregnation is carried out in an acid electrolyte containing cations of the active material and reducible ions, the redox potential of which is more positive than that of the cations of the active material. In the electrolysis process the nickel plaque is made the cathode and cations as well as reducible ions (for example, nitrate ions) migrate into the pores of the plaque. However, only the reducible ions are reduced because of their more positive potential and during their reduction hydrogen ions are consumed. This results in precipitation of the cations in the form of active material. This method is a further improvement on previous methods and is more adaptable to mass production.

Loading levels could be increased somewhat by repeated electrolytic impregnation and overnight drying between each impregnation. However, this process modification increases manufacturing time. More rapid impregnation could be achieved by increasing the temperature of the electrolyte, as described in R. L. Beauchamp, U.S. Pat. Nos. 3,573,101 issued Mar. 30, 1971 and 3,653,967 issued Apr. 4, 1972. However, even more rapid impregnation than achieved up to the present time is highly desirable, especially where a continuous impregnation procedure is used in the commercial production of electrodes. Attempts to increase loading rates by increasing the electrolytic current lead to a hard crust of active material on the surface of the plaque which results in low load levels.

SUMMARY OF THE INVENTION

The invention is a process for the manufacture of nickel cadmium batteries in which the cadmium electrodes are electrolytically impregnated in a bath which contains certain anions in addition to reducible ions (i.e., nitrate ions) which makes possible use of higher current densities in the impregnation process. These anions are chloride, iodide and sulfate ions. Chloride ions are preferred because of electrolytic stability under conditions of the impregnation process. In addition to these ions the impregnation bath also contains cadmium ions and nitrate ions and may contain nitrite ions to control pH. The temperature of the impregnation bath may vary over wide limits but is limited for convenience to the freezing point and boiling point of the solution. A temperature range between 85°C and the boiling point of the bath is preferred because of the more rapid and higher loadings obtained (see U.S. Pat. No. 3,573,101 issued to R. L. Beauchamp on Mar. 30, 1971). Concentrations of the ions in the bath may vary over wide limits. However, convenience dictates certain limits. For example, below a cadmium-ion concentration of 0.5 molar the bath often becomes depleted or continuous addition of cadmium ion is required. Above a concentration of 5.5 molar, cadmium salts tend to precipitate in the bath which is often inconvenient. A composition range of 2.0–5.0 molar is preferred because it gives maximum loadings and does not easily lead to depletion of the bath or precipitation of cadmium salts. Other cations and anions may be included in the impregnation bath to maintain charge balance and adjust the conductivity of the bath. Chloride ion should be between 10 mole percent and 98 mole percent of the anion concentration. Below 10 mole percent the beneficial effects of the chloride concentration begin to fall off, especially at high currents. The upper limit is set to insure at least some nitrate ion is present at the impregnated electrode to insure that the cadmium metal is not plated out in preference to electrolytic reduction of the nitrate ion. A chloride concentration of 50–90 mole percent is preferred. The pH of the bath solution may vary over wide limits. A convenient range is from pH of 0.5–5.0, with 1.5–3.5 preferred. Below 0.5, the impregnation process still operates but an unusually large amount of electrolysis is required to precipitate the cadmium ions and the bath is quite corrosive. Above a pH of 5.0, the possibility of cadmium precipitation exists which is inconvenient and limits cadmium ion concentration.

DETAILED DESCRIPTION OF THE INVENTION

Figure 1:
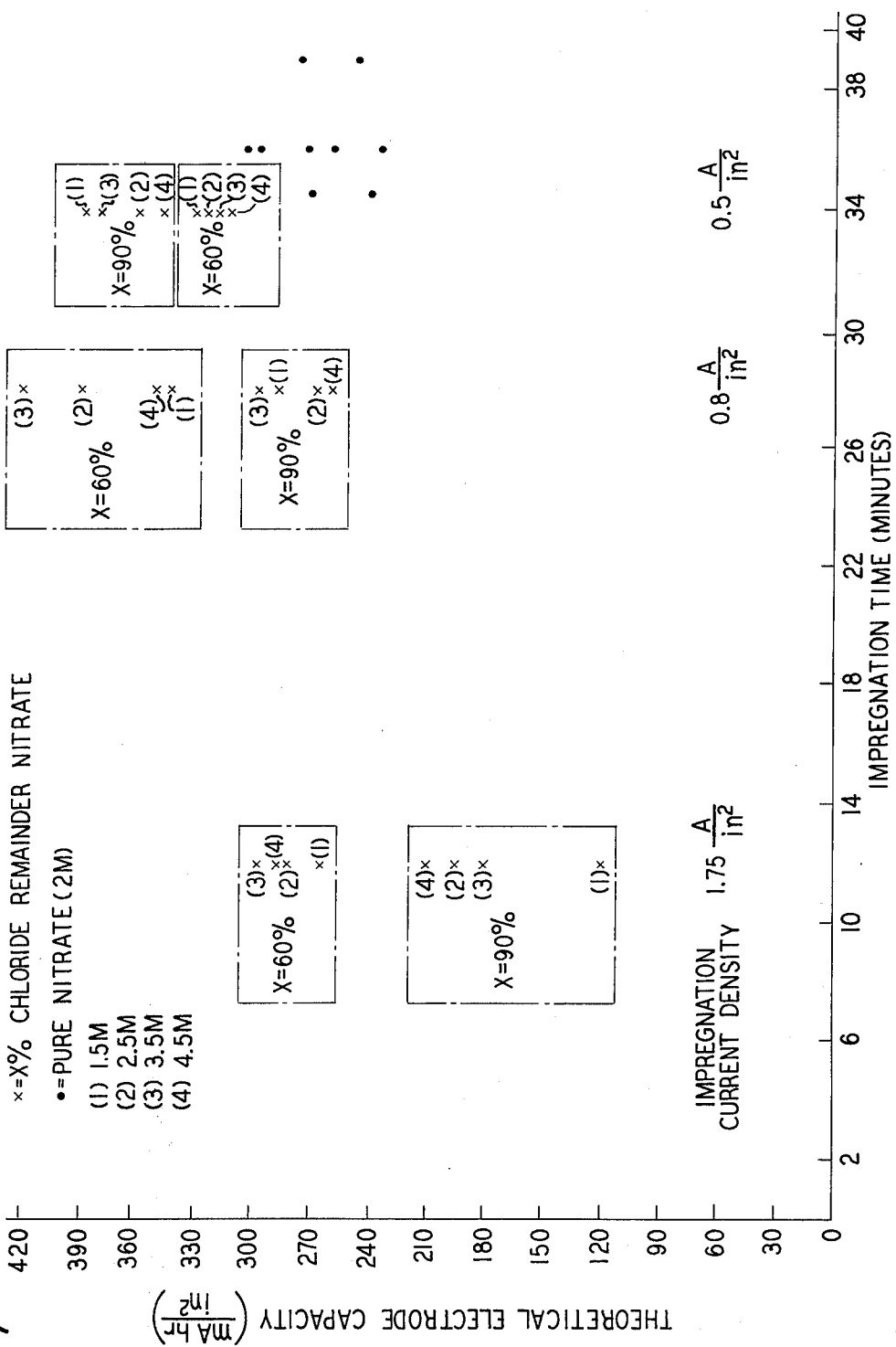
FIG. 1 is a graph of data on electrolytic loading of cadmium electrodes on coordinates of capacity of the electrodes vs. impregnation time for various bath compositions and electrolytic current densities.

The invention depends on the observation that the addition of certain specific ions to the electrolytic impregnation bath permits the use of higher currents in the impregnation process without incurring the disadvantage of excess hard deposits on the surface of the plaque. Under these conditions, higher impregnaton rates are used without sealing the outside of the plaque against migration of ions into the plaque. Thus impregnation times are made considerably shorter and higher loadings are achieved. A variety of ions are used in this procedure including chloride ion, iodide ion and sulfate ion. The selection of a specific ion or ions often turns on other considerations relevant to the impregnation process. For example, acetate ion acts as a buffer making it more difficult to electrolytically increase pH inside the plaque pores sufficiently to precipitate the cadmium ion. Other ions may interfere with the electrolytic process and are therefore usually to be avoided. Other ions, for example, perchlorate ions, might very well achieve the desired purpose but are too dangerous for a commercial process.

The chloride, iodide and sulfate ions show marked increase in impregnation rate and loading. Amongst them chloride ion is preferred because of its known stability under conditions of the electrolytic impregnation.

Other ions in the impregnation bath are as follows. Cadmium ion must be present since this is the active ingredient which must be impregnated in the nickel plaque. A reducible anion should be present to be preferentially reduced at the nickel plaque which prevents reduction of the cadmium ions and increases the pH which leads to precipitation of the cadmium ions in form of the hydroxide of cadmium ions. This anion should have a redox potential which is more positive than the cadmium ions so that this anion will be reduced in preference to the cadmium ion. A variety of anions have these properties, including, for example, chromic acid ions, chlorate ions, permanganate ions and nitrate ions. Nitrate ions are preferred because of their stability and their suitable redox potential. For ease of presentation, nitrate ions are used as the reducible ion but it is recognized that other ions may be used. Often both cadmium and nitrate ions are added in the form of cadmium nitrate, $Cd(NO_3)_2$, or a hydrated form such as $Cd(NO_3)_2 \cdot 4H_2O$. Likewise, the other anion such as chloride described above may be added in the form of a cadmium compound. It should also be noted that anions or cations may be added to maintain charge balance and to increase conductivity. For example, the concentration of nitrate and chloride might exceed that necessary to charge balance the cadmium concentration in which case cations such as sodium or potassium or other electrolytically inert cations may be added to preserve charge balance. In addition, varying amounts of other substances may be added to adjust or maintain the pH between 0.5 and 5.0. A particular example is the addition of nitrite ions in the amount from 0.1 molar to saturation which is used to control the pH. Other pH-adjusting substances are strong acid or strong base such as nitric acid or potassium hydroxide.

A variety of experiments were carried out to show that the addition of these certain anions leads to improved electrolytic impregnation of cadmium in nickel plaques. These experiments are divided up into three groups, depending on the nature of the counterelectrode and whether or not an external power supply is used to produce the impregnation current. Data from the first group of experiments are shown in FIG. 1. Here an inert counterelectrode (made of platinum or platinum coated titanium) was used. Experiments were carried out at a variety of current densities and for a sufficient time to give reasonable capacities. The theoretical capacity was measured by the weight gain of the nickel plaque during the impregnation process. The inventive chloride-nitrate bath could be compared with the pure nitrate bath only for relatively low impregnation currents. At higher impregnation currents the pure nitrate bath yielded plaques with large amounts of hard crust on the surface which cannot be used as cadmium electrodes in cadmium nickel batteries. The data shows that over a considerable range of nitrate concentration and a considerable range of chloride concentration the capacity of the impregnated electrodes considerably exceeds that of electrodes made from pure nitrate baths. More importantly, it was found that much higher currents and, therefore, much shorter impregnation times could be used without any detriment in the capacity of the electrodes. It should be noted that these impregnation experiments were carried out at the boiling temperature of the bath. In these experiments nitrite ion was sometimes added to maintain the pH of the solution above 1.5.

A second group of experiments were carried out in which an external power supply was used to supply a constant current and cadmium was used as the counterelectrode. An advantage of cadmium counterelectrodes is that they tend to maintain the cadmium ion concentration at a constant level and the pH tends to increase rather than decrease. Increasing pH is somewhat easier to counteract since the addition of concentrated acid does not lead to precipitation of cadmium as would the addition of concentrated base. The results of these experiments are summarized in Table I. The initial cadmium concentration was 5 molar which was made up by the addition of a given mole percent cadmium chloride, remainder cadmium nitrate. The various mole percents of $CdCl_2$ are shown in the Table.

TABLE I

| | Impregnation Results Using Cadmium Counterelectrodes | | |
|---|---|---|---|
| Current Density Amp/in$^2$ | Time (Min.) | Percent $CdCl_2$ | Capacity ($\frac{ma\text{-}hr}{in^2}$) |
| 1.65 | 12 | 87 | 290 |
| 1.65 | 12 | 75 | 327 |
| 2.20 | 9 | 87 | 304 |
| 2.20 | 9 | 75 | 296 |
| 2.20 | 9 | 50 | 302 |
| 4.5 | 4 | 87 | 225 |
| 4.5 | 4 | 75 | 220 |

As can be seen from the table, quite acceptable loadings were obtained in quite short times using the inventive procedure. It was also observed that where very high current densities were used, high chloride concentrations (at least 50 percent and in some cases at least 70 percent) were necessary to achieve high capacities and to prevent the production of a hard crust on the surface of the nickel plaques.

Another series of experiments were carried out using cadmium counterelectrodes and an external current source. This series of experiments was designed to determine which ions were most effective in producing the good impregnation results. These experiments are summarized in Table II. The current density used in these impregnation experiments was 2.5 amp/in.$^2$.

TABLE II

| Ion | Anion conc. | % Ion (Remainder nitrate) | Impregnation time | Capacity ($\frac{ma\text{-}hr}{in^2}$) |
|---|---|---|---|---|
| Acetate | 5M | 80 | 10 | 84 |
| Bromide | 5M | 80 | 10 | 100 |
| Iodide | 5M | 80 | 10 | 160 |
|  | 2.5M | 60 | 10 | 217 |
| Sulfate | 5M | 80 | 8 | 150 |
|  | 2.5M | 80 | 10 | 232 |
|  | 2.7M | 80 | 12 | 327 |
| Nitrate | 1M | — | 8 | 204 |
|  | 1M | — | 8 | 185 |
|  | 2M | — | 8 | 180 |

The results summarized in Table II show that both iodide and sulfate ions lead to improved capacities over pure nitrate solutions. To show the uniqueness of these ions, several other ions (i.e., acetate and bromide) were included in these experiments which are highly ionic but which do not show improved capacities. However, it should be recognized that although acetate and bromide ions did not yield improvements under the specific conditions of these experiments, other conditions, including mixtures with other ions and variations in concentration, might yield improved results.

A third series of experiments was carried out in which cadmium counterelectrodes were used, but no source of external current. In these experiments the cadmium counterelectrodes were electrically connected directly to the plaques being impregnated. The difference in potential between the two electrodes serves as the source of current. The particular advantage of this procedure is that no external power supply is required. Also, the addition of chloride ion not only serves to improve the impregnation mechanism allowing for higher rates and greater capacities, but it also adjusts the potential between the two electrodes which in turn can be used to adjust the rate and extent of impregnation.

The results of these experiments are shown in Table III. The experiments were carried out at the boiling temperature of the bath (approximately 105°C), and with a cadmium concentration of 2 molar. The table shows the percent cadmium chloride, remainder cadmium nitrate. The impregnation was carried out for approximately 40 minutes in each case.

TABLE III

Impregnation Results Using No External Current

| Percent $CdCl_2$ | Theoretical Capacity $\frac{ma\text{-}hr}{in^2}$ |
|---|---|
| 10 | 255 |
| 50 | 346 |
| 70 | 368 |
| 80 | 384 |
| 90 | 392 |

The results of these experiments show that under these conditions capacity increases as chloride concentration increases, and that the addition of chloride ion to the impregnation bath leads to higher loadings.

Because of the rapid impregnation achievable with the inventive process, this procedure is particularly adaptable to a continuous impregnation process. In this type process a long belt of sintered nickel plaque is continuously run through an impregnation bath. Counterelectrodes, either of inert material or cadmium, are also located in the bath. The speed at which the plaque is drawn through the bath can be adjusted so as to vary impregnation time. External current source may be used or, in the case of cadmium counterelectrodes, the procedure may be carried out without external current. The counterelectrodes may be located at a constant distance away from the nickel plaque (constant potential impregnation) or the distance varied so as to achieve approximately constant impregnation rate along the length of the plaque belt. In this latter procedure the electrical resistance between counterelectrode and plaque is varied by varying the distance between these two electrodes. Using this procedure the electrolytic current can be made approximately constant along the length of the plaque belt.

Figure 2:
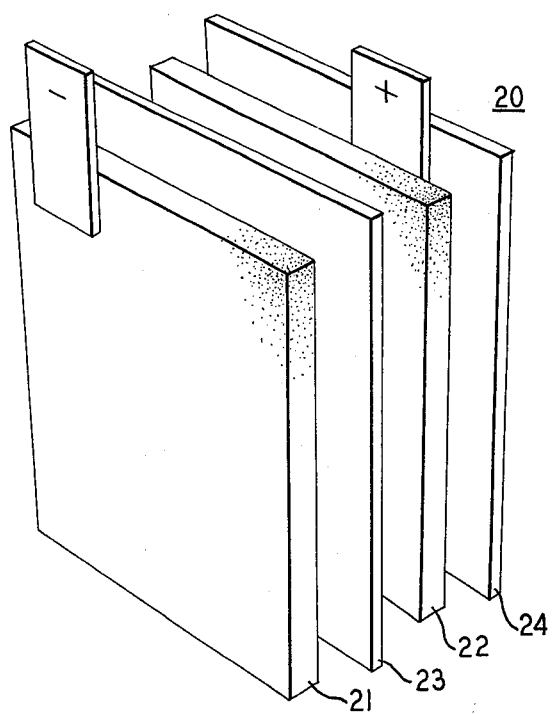
FIG. 2 shows in perspective view components of a nickel cadmium battery containing an electrode made in accordance with the invention.

FIG. 2 shows several components of a typical nickel cadmium battery 20. The negative electrode 21 is a cadmium electrode made in accordance with the invention. The positive electrode 22 is a nickel electrode. Also shown are separators 23 and 24 used to electrically insulate the negative electrode from the positive electrode. Here the separators are made from microporous polymeric material. A multiplicity of such positive electrodes and negative electrodes may be assembled so as to make up a completed battery. The electrolyte in this particular battery is a 30% by weight KOH in water. In fabricating such a battery the individual electrodes are usually formed (electrolytically cycling the electrodes several times) and then assembled in the discharged condition. On charging the battery becomes ready for use.

Figure 3:
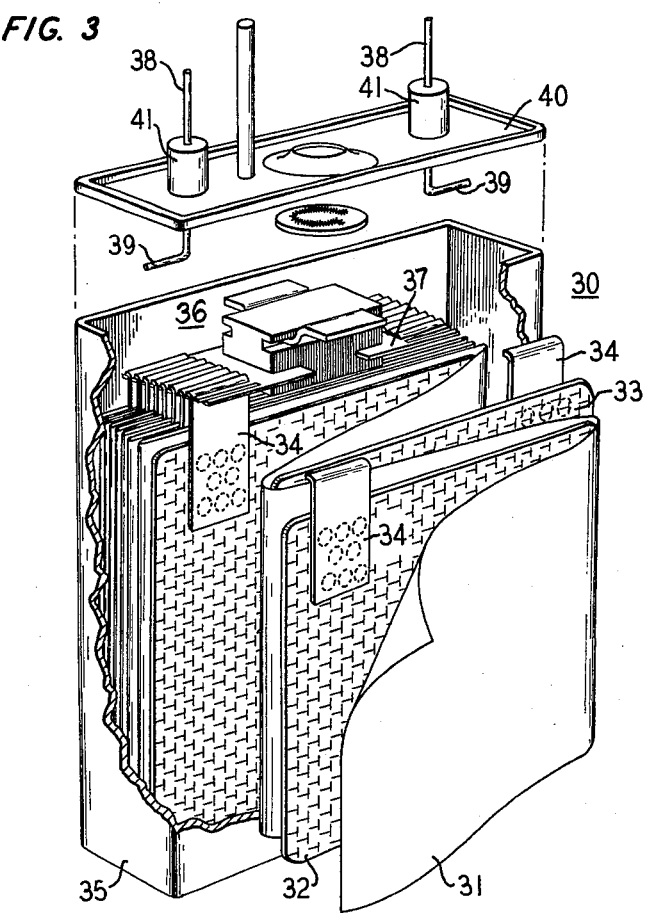
FIG. 3 shows in perspective view partly in section of a nickel cadmium battery employing multiple positive and negative electrodes made in accordance with the invention.

A more detailed drawing of a battery is shown in FIG. 3. This figure shows a partially assembled sealed nickel cadmium battery 30. The battery is made up of a separator 31, and a negative electrode 32 which is impregnated with cadmium and made in accordance with the invention. Also shown is a positive electrode 33 impregnated with nickel together with metal tabs 34 and outer battery container 35. The metal tabs are connected together by a core structure having negative 36 and positive 37 electrodes. An electrical connection is made to battery posts 38 by means of metal strips 39. The metal posts are connected to the cover plate 40 by means of a compression seal 41.

What is claimed is:

1. A process for the fabrication of nickel cadmium batteries in which the cadmium electrodes are made by a series of steps comprising immersing a porous nickel plaque in a solution with pH between 0.5 and 5.0 which contains cadmium ions and a reducible anion, the redox potential of which is more positive than the redox potential of the cadmium ions, followed by impregnating the plaque by precipitating the hydroxide of the cadmium ions from the solution in the pores of the plaque by electrolytic action at a given current density in the temperature range from 85°C to the boiling point of the solution, characterized in that said solution contains an additional anion selected from the group consisting of chloride, iodide and sulfate with concentration between 10 and 98 mole percent of the total anion concentration.

2. The process of claim 1 in which the cadmium ion concentration is between 0.5 and 5.5 molar.

3. The process of claim 2 in which the concentration of cadmium ions is between 2.0 and 5.0 molar.

4. The process of claim 1 in which the additional anion is chloride ion.

5. The process of claim 4 in which the concentration of chloride varies between 50 and 90 mole percent of the total anion concentration.

6. The process of claim 1 in which the pH varies between 1.5 and 3.5.

7. The process of claim 1 in which the impregnation process is carried out on a continuous strip of nickel plaque.

8. The process of claim 7 in which the distance between nickel plaque and counterelectrodes is varied so as to maintain a substantially constant impregnation rate along the length of the nickel plaque.

9. The process of claim 1 in which the counterelectrodes are inert electrodes.

10. The process of claim 1 in which the counterelectrodes are cadmium electrodes.

11. The process of claim 1 in which nitrite ion is present in a concentration between 0.1 molar and the maximum concentration for this solution.

12. The process of claim 1 in which the current density is at least 0.5 Amp/in$^2$.

13. The process of claim 12 in which the current density is at least 0.8 Amp/in$^2$.

14. The process of claim 13 in which the current density is at least 1.75 Amp/in$^2$.

15. The product produced by the process of claim 1.

16. A nickel cadmium battery containing a cadmium electrode produced by the process of claim 1.

* * * * *